United States Patent [19]
Ware

[11] Patent Number: 5,522,156
[45] Date of Patent: Jun. 4, 1996

[54] DRYING APPARATUS AND METHOD

[76] Inventor: Gerald J. Ware, 754 Brookside Ct., Vacaville, Calif. 95688

[21] Appl. No.: 233,378

[22] Filed: Apr. 26, 1994

[51] Int. Cl.$^6$ ........................................................ E02F 5/06
[52] U.S. Cl. .................................... 34/356; 34/95; 34/353
[58] Field of Search ............................. 34/95, 356, 353, 34/354

[56] References Cited

U.S. PATENT DOCUMENTS

| | | | |
|---|---|---|---|
| 703,393 | 7/1902 | Edson | 34/354 |
| 841,030 | 1/1907 | Marshall . | |
| 2,199,670 | 5/1940 | Lowry . | |
| 2,275,117 | 3/1942 | Vogel-Horgensen . | |
| 3,239,942 | 3/1966 | Mink et al. | 34/353 |
| 3,290,790 | 12/1966 | Kunii et al. | 34/95 |
| 3,442,769 | 5/1969 | Heinz . | |
| 3,459,638 | 8/1969 | Nagel . | |
| 3,653,424 | 4/1972 | Carlsson . | |
| 3,843,462 | 10/1974 | Phillips . | |
| 3,898,745 | 8/1975 | Carlsson . | |
| 4,587,745 | 5/1986 | Tanner | 34/95 |

FOREIGN PATENT DOCUMENTS

| | | | |
|---|---|---|---|
| 608014 | 12/1925 | France . | |
| 500 | 1/1885 | United Kingdom . | |

Primary Examiner—John T. Kwon
Attorney, Agent, or Firm—John P. O'Banion

[57] ABSTRACT

An apparatus for drying solid and liquified products using heating gas and a plurality of spherical balls having contacting surfaces. A drying chamber is established between a housing and a central body which is coaxially positioned through the center of the housing. Located within the drying chamber are a plurality of balls which form a drying bed. A screw auger is coaxially positioned through the center of the central body to circulate the balls through the drying chamber by moving them from the bottom to the top of the drying chamber where they are redeposited into the bed. A rotatable balls dispersing chute is coupled to the screw auger at the upper end of the central body to evenly distribute balls over the top of the bed of balls as it rotates. The central body includes an annular skirt toward its lower end to deflect balls which are moving downward through the drying chamber and to create a restriction in the lower end of the drying chamber so that the balls recirculate at an even rate in relation to each other rather than having some balls move downward more quickly than others. The auger shaft includes a hollow upper end which serves as a product inlet and through which a product dispersing tube extends outward and over the bed of balls. As the auger rotates, so does the product dispersing tube to distribute the product evenly over the top of the bed of balls. A plurality of drying tubes extend between the dryer housing and the central body in evenly spaced radial positions in the drying chamber at approximately the vertical midpoint thereof to inject heated gas into the bed of balls. The drying tubes include outlets through the injected gas enters the drying chamber to permeate the bed of balls for drying. The drying tubes are coupled to a gas duct which extends around the circumference of the dryer housing and which is coupled to a heater/blower unit for heating and introducing drying gas into the gas duct. A grid or grating is included at the bottom of the drying chamber to retain the balls for recirculation but permit dried product to pass for conveying out of the dryer. Product which is introduced at the upper end of the drying chamber coats the balls and moves downward through the bed as the balls recirculate. As the balls move downward, the product is dried by the heated gas, and shrinks and separates from the balls. The product passes through the grid at the lower end of the drying chamber and is air conveyed out of the dryer.

18 Claims, 6 Drawing Sheets

DRYING APPARATUS AND METHOD

BACKGROUND OF THE INVENTION

1. Field of the Invention

This invention pertains generally to drying liquid and solid particulate materials, and more particularly to an apparatus and method for efficiently drying products of various viscosity and sizes.

2. Description of the Background Art

Devices and methods for evaporation of liquids and drying of solid material are used in chemical, pharmaceutical, food processing, and other industries. Frequently, drying devices use balls, pellets, or other generally spherical contact bodies as drying or heating media to provide large drying surface areas. In using such devices and methods, a solution, suspension or dispersion of material is typically spread over a bed of plastic or metal balls within a drying chamber, and heat is applied, either by thermal conduction or application of heated air. The moisture evaporates, leaving solid material coating the balls. Agitation of the balls removes the dried solids. New liquid solution or suspension can then be applied, and the process repeated. Other drying devices heat the balls externally, then immerse the heated balls into the liquid to be evaporated. Generally, the balls are circulated or recycled in the drying chamber by a screw conveyor, bucket elevator, or the like.

Several devices and methods which use balls and pellets for drying and evaporation purposes have been disclosed. For example, U.S. Pat. No. 2,275,117 discloses a process and apparatus for preheating or drying slurry in which a rotary kiln has radially located compartments containing charges of generally round movable bodies. Slurry is introduced to the kiln and distributed over the movable bodies by rotating the kiln. Heated air is blown across the moving bodies, and the dried material passes through a perforated wall out of the kiln.

U.S. Pat. No. 3,442,769 discloses a method and apparatus for heating and distilling saline water wherein heated pebbles are added to saline water in a distillation vessel and vapor distilled therefrom, with the pebbles passing through an opening in the bottom of the vessel to a ball mill. From the mill, the pebbles are carried up by a screw conveyor or bucket elevator to a heater, and then added again to the distillation vessel.

U.S. Pat. No. 3,459,638 discloses a method for desalination of sea water using heated metal balls to vaporize water. Balls are conveyed through a furnace and fed into a still containing sea water. The balls are removed from the still and conveyed back through the furnace, and then the still again. Water vapor is distilled, and concentrated brine is removed from the bottom of the still.

U.S. Pat. No. 3,843,462 discloses a hot ball desalination process in which brine solution is introduced countercurrently to heated pellets. Water vapor is flash distilled from the brine, and the pellets are then reheated and new brine introduced.

U.S. Pat. No. 3,653,424 discloses a method and apparatus for concentrations solutions or suspensions or for recovering the dry substance thereof, in which liquid is spread onto a bed of interengaging spheres within a chamber, and air is forced through the spheres to effect drying. The spheres are continuously transported from the bottom to the top of the chamber by a screw conveyor. Dried solids escape through a grate at the bottom of the chamber.

U.S. Pat. No. 3,898,745 discloses a drying apparatus for concentrating solutions wherein liquid is applied to a bed of contact bodies in a chamber. The contact bodies are continuously circulated from the bottom to the top of the chamber by a screw conveyor, while air is passed through the bodies to achieve drying. Dried solids fall through a perforated base in the bottom of the chamber.

French Patent No. 608,014 discloses a process and apparatus for transmission of heat and cold wherein balls in an upper chamber are heated or cooled by a gas or liquid stream of desired temperature, then gravity fed to a lower chamber wherein the balls are used to heat or cool the contents of the lower chamber, for distillation or other purposes. The balls escape from the bottom of the second chamber and are conveyed by a bucket elevator to the upper chamber again.

As can be seen therefore, a variety of drying apparatuses and processes using balls or pellets are known. However, the currently used drying apparatuses suffer significant drawbacks. For example, as balls leave the screw conveyor or other ball circulating means, the balls tend to mound up in one area, resulting in an uneven bed of balls, thus reducing drying efficiency. This problem of mounding is especially prevalent in drying of sticky or tacky materials such as food products. Additionally, the existing art does not effectively allow even application of liquid or other materials to be dried onto the bed of balls, resulting in uneven distribution on the drying bed and reduced drying efficiency Further, many materials that are dried on an industrial scale are air sensitive and can suffer undesirable oxidation upon drying. Particularly, food products such as apples, and other fruits and vegetables discolor or lose flavor and fragrance when exposed to heated air. Use of an inert gas such as nitrogen in the drying apparatus helps avoid this problem, but available drying apparatuses are not well suited for use with inert atmospheres.

Therefore, there is a need for an apparatus and method for drying materials which provides for even distribution of balls when forming the drying bed, which provides for even application of materials to be dried over the drying bed, and which is suitable for use with inert or non-oxidizing atmospheres. The present invention satisfies these needs, as well as others, and overcomes the deficiencies found in prior drying devices and methods.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention pertains generally to an apparatus and method for drying materials of varying viscosity, moisture content, and size. In general terms, the apparatus of the present invention comprises a dryer housing, a drying chamber, a plurality of balls or pellets which form a bed within the drying chamber, means for circulating the balls within the drying chamber, means for evenly distributing the balls to form an even bed, means for dispersing material to be dried evenly over the bed of balls, means for injecting a heated gas into the drying chamber, means for distributing the heated gas throughout the bed of balls, means for drying the product distributed over the balls, and means for separating dried product from the balls and removing the dried product from the drying chamber.

By way of example and not of limitation, the apparatus of the present invention includes a dryer housing which is a generally cone-shaped structure having upper and lower ends, with the cone vertex at the lower end of the housing. A central body is coaxially positioned through the center of the housing between the upper and lower ends thereof, thereby defining a drying chamber in the area between the central body and the dryer housing. Located within the drying chamber are a plurality of balls which form a drying bed. The central body includes a coaxially positioned opening extending between its upper and lower ends in which a screw auger is positioned as a ball circulating means. The screw auger is rotatably mounted on a shaft which extends between the upper and lower ends of the dryer housing and which is coupled to a source of rotational power. Balls are moved by the screw auger from the lower end of the drying chamber to the upper end of the drying chamber through the opening through the central body where they are redeposited into the bed. A chute having a plurality of downward sloping grooves or tracks of varying length to accommodate the balls is coupled to the screw auger at the upper end of the central body as a means to evenly distribute balls over the top of the bed of balls as it rotates. The central body includes an annular skirt toward its lower end to deflect balls which are moving downward through the drying chamber and to create a restriction in the lower end of the drying chamber so that the balls recirculate at an even rate in relation to each other rather than having some balls move downward more quickly than others. The auger shaft includes a hollow upper end which serves as a product inlet and through which a pipe or tube is positioned as a product dispersing means. The product dispersing tube extends out of the side of the auger shaft at an angle with the end thereof positioned over the bed of balls, and is rotationally offset from the ball distributing means by approximately 180 degrees. As the auger rotates, so does the product dispersing means to distribute the product evenly over the top of the bed of balls. A plurality of drying tubes extend between the dryer housing and the central body in evenly spaced radial positions in the drying chamber at approximately the vertical midpoint thereof as a means for distributing injected gas into the bed of balls. The drying tubes include outlets through which the injected gas enters the drying chamber to permeate the bed of balls for drying. The drying tubes are coupled to a gas duct which extends around the circumference of the dryer housing as a gas injection means and which is coupled to a heater/blower unit for heating and introducing temperature-controlled drying gas into the gas duct. A grid or grating is included at the bottom of the drying chamber as a means for separating dried product from the balls, which permits particles of dried product to fall through but prevents the balls from escaping.

In operation, the drying chamber is substantially filled with a bed of balls or pellets. The balls are circulated in the dryer from bottom to top by the screw auger, with the balls being evenly distributed on the top of the bed as they emerge from the screw conveyor by the ball distributing chute. The product to be dried is air conveyed into the apparatus through the feed tube and distributed evenly across the top of the bed of balls, thereby coating their outer surfaces. At the same time, temperature-controlled air or inert gas is applied through the gas inlets. As the screw auger circulates the balls, the balls coated with drying product progress downward in the dryer, with the product coating the balls progressively becoming more dry as it is continually exposed to the heated air or gas. As the product drys, it shrinks and separates from the balls. The agitation resulting from the balls moving downward in the dryer helps displace dried product from the balls, and the dried product falls through a grid at the bottom of the dryer, the grid being suitably adapted to retain the balls. Positive pressure created by the injected gas causes the dried product to be air conveyed out of the bottom of the apparatus. The balls eventually approach the vertex of the dryer and enter the screw auger which carries them up where they are again evenly distributed on the bed. Moisture from the dried product is removed from the dryer through the gas outlet or outlets.

An object of the invention is to provide a drying apparatus which provides even distribution of balls or pellets at the top of the drying bed and avoids the problem of mounding.

Another object of the invention is to provide a drying apparatus which allows even distribution of products to be dried on the drying bed.

Another object of the invention is to provide a drying apparatus which is suitable for use with inert atmospheres such as nitrogen.

Another object of the invention is to provide a drying apparatus which is can be used to dry solid particulate products as well as liquid products.

Another object of the invention is to provide a drying apparatus which can direct drying gas in either co-current or counter current as desired.

Another object of the invention is to provide a drying apparatus which can be used to dry sewage sludge into product useful as fertilizer.

Another object of the invention is to provide a drying apparatus which can also be used as an exhaust scrubber for removing $SO_2$ and $NO_x$ from air.

Another object of the invention is to provide a drying apparatus which is compatible with drying of sticky or tacky products.

Another object of the invention is to provide a drying apparatus which can be used at elevated temperatures to decontaminate soil, removing volatile hydrocarbon and chlorocarbon contaminants and leaving sterile soil ready for use.

Another object of the invention is to provide a drying apparatus which can receive multiple air or gas inlets at different temperatures so that desired temperature gradients can be obtained in the drying bed.

Further objects and advantages of the invention will be brought out in the following portions of the specification, wherein the detailed description is for the purpose of fully disclosing preferred embodiments of the invention without placing limits thereon.

BRIEF DESCRIPTION OF THE DRAWINGS

The invention will be more fully understood by reference to the following drawings which are for illustrative purposes only.

DETAILED DESCRIPTION OF THE PREFERRED EMBODIMENTS

Figure 1:
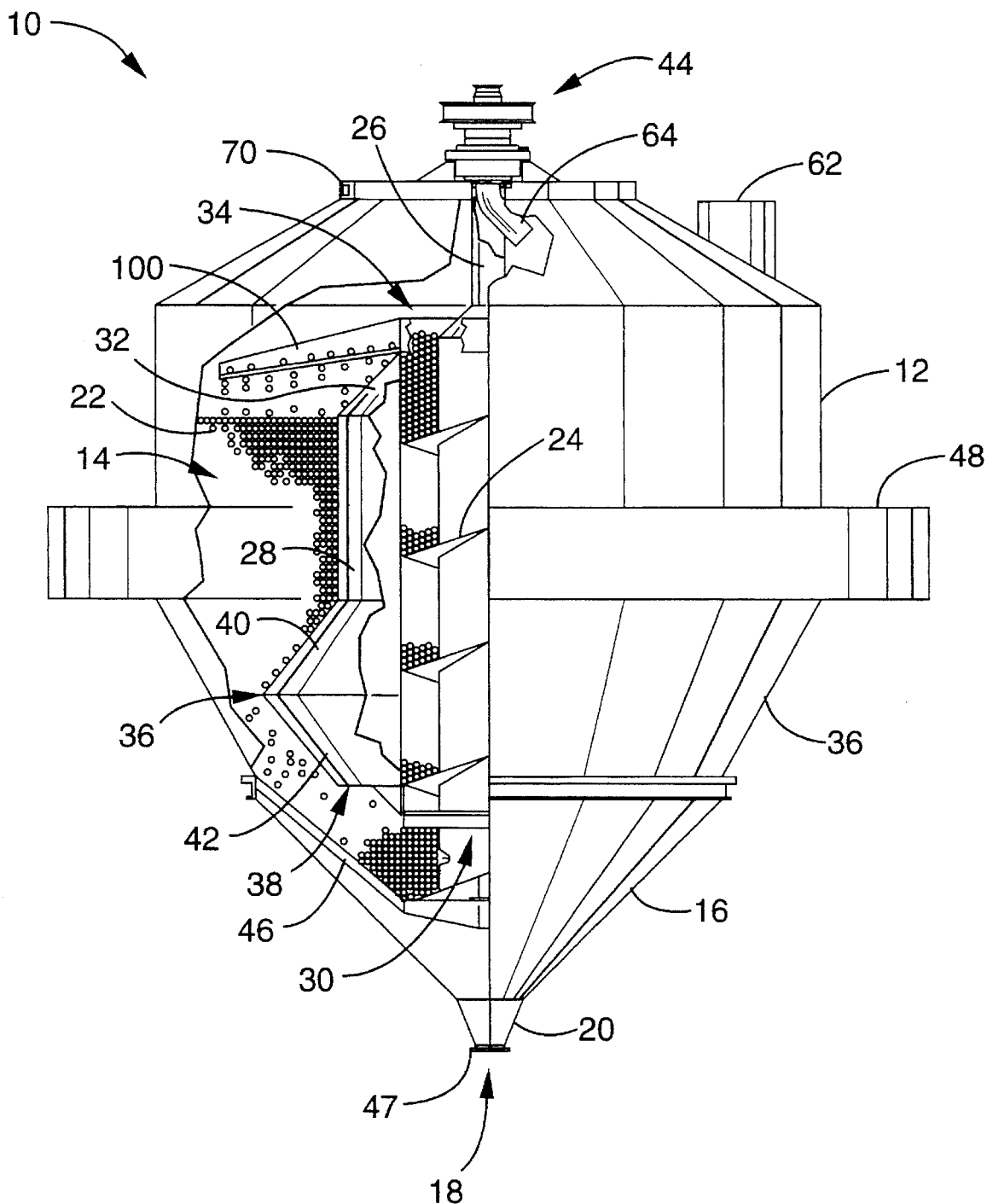
FIG. 1 is a side elevation of the apparatus of the present invention in partial cutaway showing the internal mechanism of the apparatus.

Referring more specifically to the drawings, for illustrative purposes the present invention is embodied in the apparatus which is generally shown in FIG. 1 through FIG. 7, where like reference numerals indicate like parts. It will be appreciated that the apparatus may vary as to configuration and as to details of the parts, and that the method of the invention may vary as to the precise steps and their sequence without departing from the basic concepts as disclosed herein.

Figure 2:
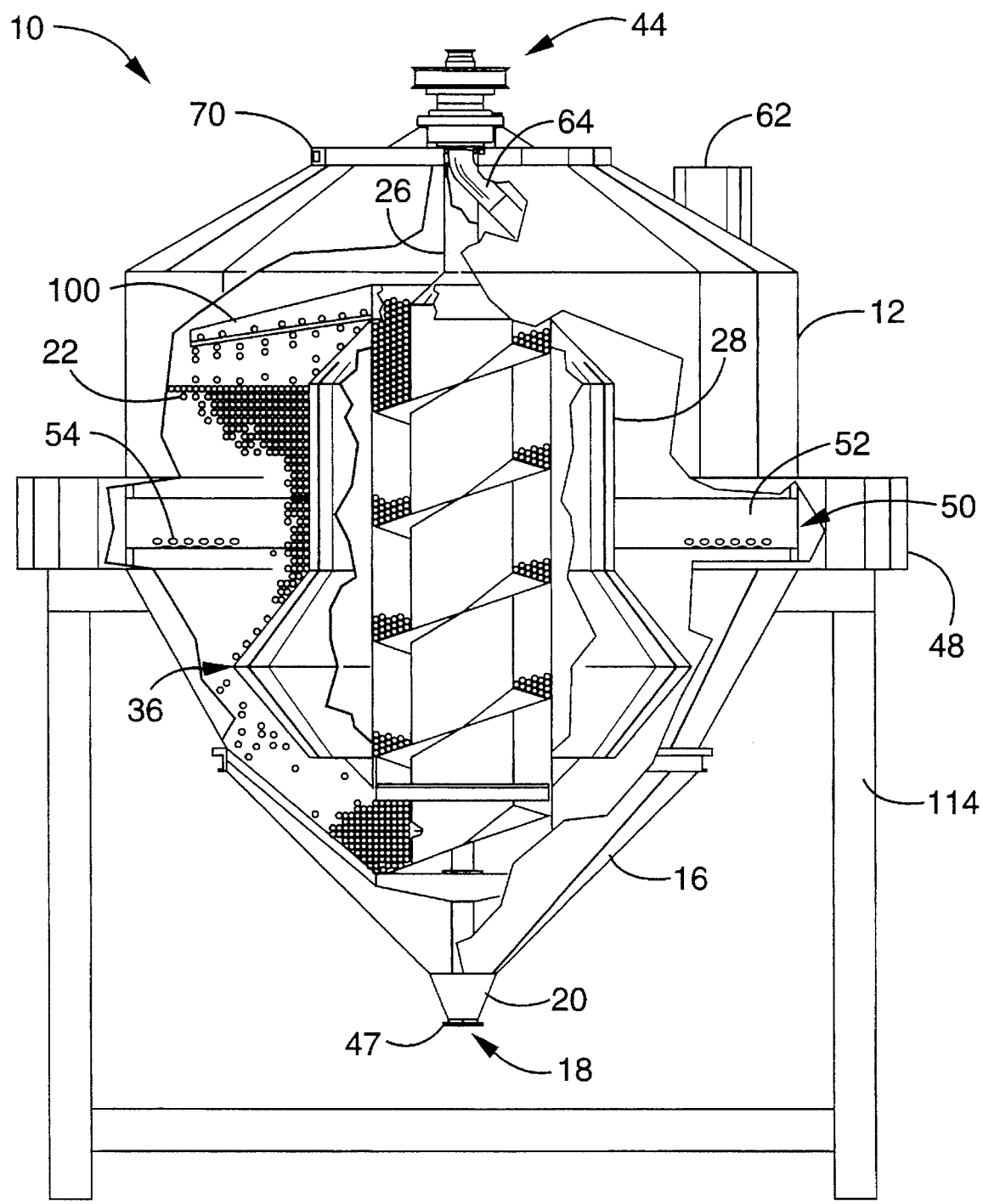
FIG. 2 is side elevation of the apparatus of the present invention in partial cutaway showing the internal mechanism of the apparatus and further showing a support stand.

Referring first to FIG. 1 and FIG. 2, a drying apparatus 10 in accordance with the present invention is shown. The apparatus includes a generally conical dryer housing 12 which includes a drying chamber 14 together with a separator cone 16 having a particle outlet 18 located at vertex 20. Included within drying chamber 14 are a plurality of generally spherical balls or pellets 22 which form a drying bed. Balls 22 are generally spherical so as to maximize their outer surface area. By fabricating balls 22 from high temperature materials such as virgin polyesters or the like, drying gases can be injected at temperatures as high as 400° F. to both dry and sterilize the product, since such materials have melting points on the order of 555° F. In low temperature or non-stick applications, balls 22 can be made from materials such as Teflon® or the like. Such materials are ideally suited for drying products which have a high sugar content and which would stick to other materials.

Drying chamber 14 also includes means for circulating the balls 22, preferably in the form of a screw auger 24 mounted vertically on a shaft 26. Screw auger 24 is housed within a central body 28 which acts as a stator for screw auger 24. Screw auger 24 extends out from and below central body 28 so that the lower end 30 of screw auger 24 is not housed in central body 28. Preferably, central body 28 has a taper 32 at its upper end 34, and has an annular skirt 36 near its lower end 38. As shown, skirt 36 is of a configuration having opposing conical tapers so as to form and outwardly tapering shelf 40 and an inwardly tapering lower wall 42. Note also that the inward taper of lower wall 42 generally matches the inclination of the taper of separator cone 16. As a result of this configuration, balls 22 will flow toward the bottom of the apparatus at a uniform rate. In other words, skirt 36 acts as a means to deflect balls which would otherwise follow the vertical path adjacent to the outer wall of central body 28. Without skirt 36, balls 22 which are deposited in the area adjacent to the wall of central body 28 first, would reach the bottom of the drying chamber first. However, it is desirable for all of the balls to have the same relative movement as they progress from the top to the bottom of the apparatus to promote uniform drying of the product. Therefore, skirt 36 deflects the balls moving downward to an area of flow restriction formed between dryer housing 12 and skirt 36 so that the balls pass through the restriction at a uniform rate of descent.

Shaft 26 extends outward from the upper end of dryer housing 12 and is coupled to a source of rotational power such as a pulley and bearing drive assembly 44 coupled to an external motor, or an integral motor attached to the apparatus itself. Those skilled in the art will appreciate that the rotational drive mechanism could be alternatively located at the bottom of the apparatus.

Means for separating dried product from balls 22 is preferably a grid 46 associated with separator cone 16 in drying chamber 14. As shown, grid 46 is configured to conform generally to the conical shape of the separator cone 16, with the central portion of grid 46 being generally horizontal. Screw auger lower end 30 is adjacent the flat central portion of grid 46, with shaft 26 passing through the center of grid 46 where it is supported at its lower end at vertex 20. Grid 46 contains a plurality of perforations (not shown), which are sized to allow dried product to fall through the perforations while retaining the balls 22. The dried product exits the dryer in the separation cone 16 through grid 46. Grid 46 allows the dried product to drop through and holds the weight of the balls 22, containing them until they are returned to the top of the apparatus by screw auger 24. In this arrangement, balls 22 must pass along the grid, shedding dried product, before the balls 22 reach screw auger 24 and are carried back up towards the top of drying chamber 12. Dried product exits drying chamber 14 through particle outlet 18. Flange 47 on particle outlet 28 allows attachment of pipes, hoses, or the like to convey dried product.

Figure 3:
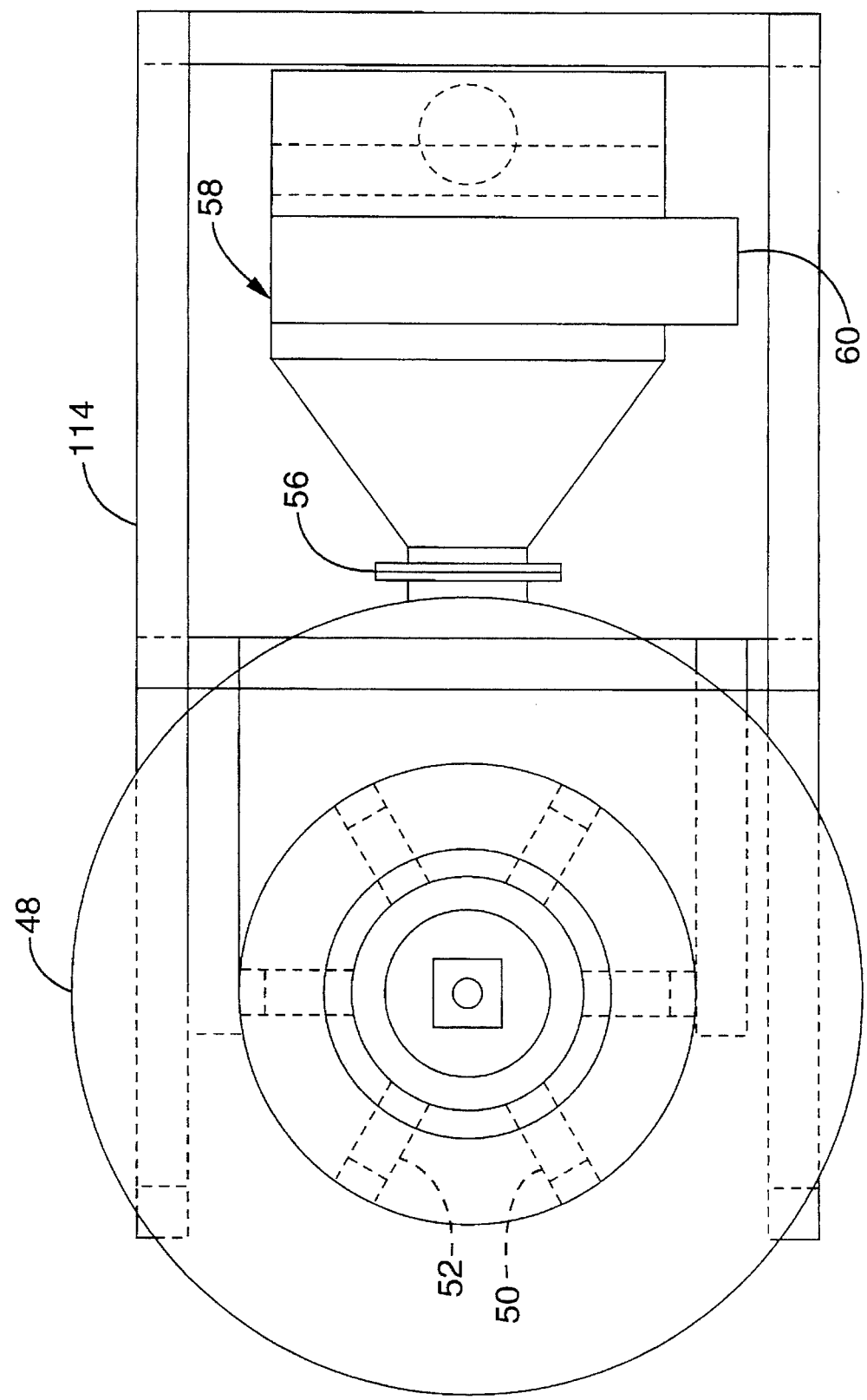
FIG. 3 is a plan view of the apparatus of FIG. 2 shown attached to a heater/blower unit.

Referring to FIG. 3 as well as FIG. 1 and FIG. 2, the gas injection and drying means for the apparatus is shown. A drying gas supply duct 48 encircles dryer housing 12 and has a plurality of openings 50 which extend through dryer housing 12 and into drying chamber 14. Preferably, a plurality of drying tubes 52 are coupled to openings 50, with drying tubes 52 extending inward from housing dryer 12 to central body 28. As shown, there are six drying tubes 52 radially arranged within drying chamber 14 in a manner similar to wheel spokes; however, the number of drying tubes 52 can vary. Further, this arrangement of drying tubes 52 ensures that the movement of balls 22 is not hindered. Drying tubes 52 include a plurality of orifices 54 underside through which drying gas can enter the drying chamber 14. The angle or direction of these orifices can be varied to facilitate particular drying operations; however, in the preferred embodiment orifices 54 are positioned on the underside of drying tubes 52 so that the drying gas is directed downward toward the bottom of drying chamber 14. Drying gas is introduced into gas supply duct 48 through a flanged coupling 56 which couples gas supply duct 48 to a heater/blower unit 58. An external source of drying gas is coupled to heater/blower unit in any conventional manner and introduced through inlet 60. A drying gas exhaust outlet 62 is also included near the top of dryer housing 12 for venting the system. Those skilled in the art will appreciate that gas supply duct 48 could be eliminated and that the external supply of drying gas coupled directly to drying tubes 52. Alternatively, drying gas could be injected into drying chamber 14 at a single locating rather than at a plurality of locations as shown. However, in the preferred embodiment, the drying gas is injected into drying chamber 14 at multiple locations for even distribution within drying chamber 14.

Figure 4:
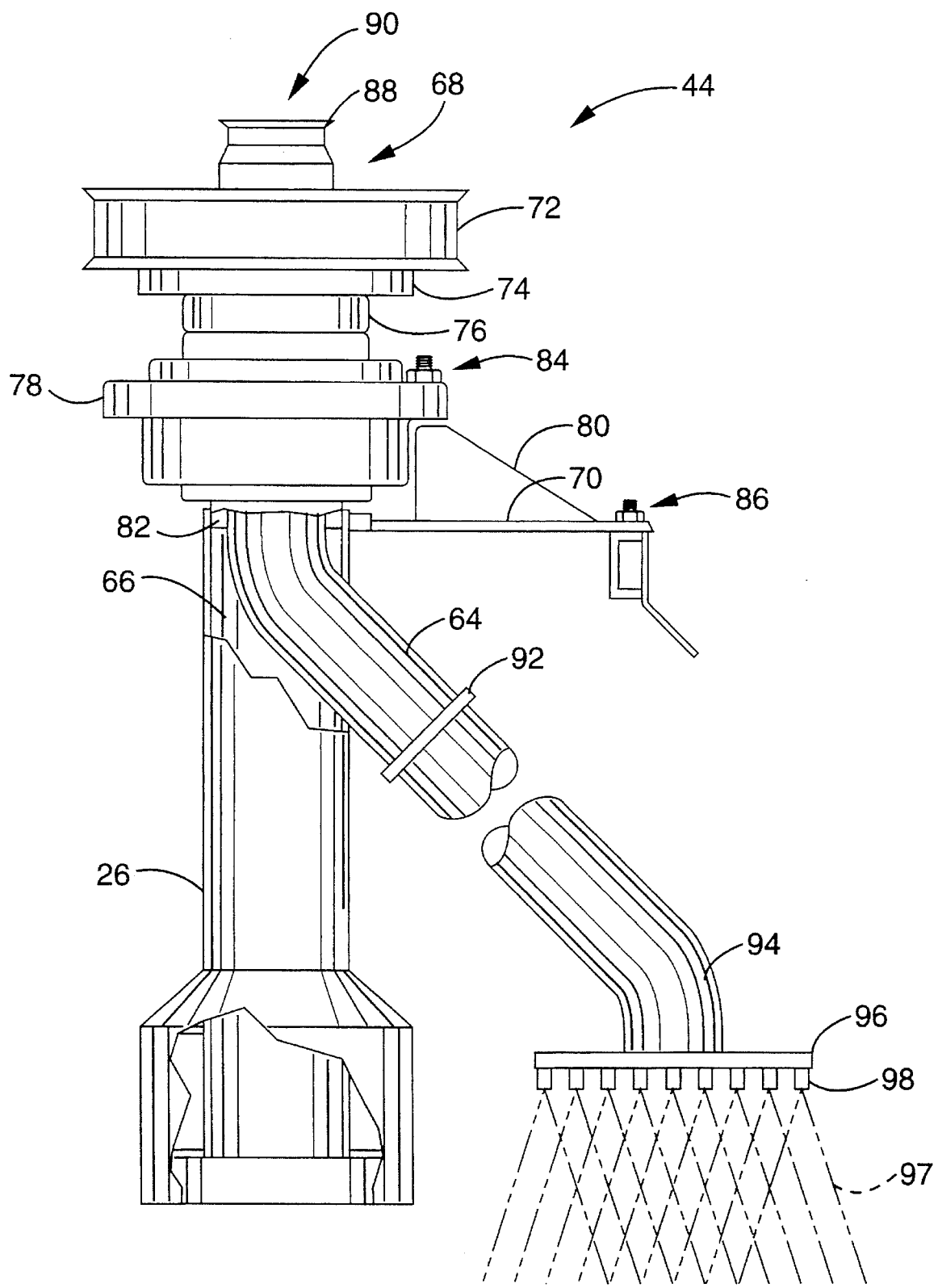
FIG. 4 is a detail side elevation of the drive mechanism and product inlet portion of the apparatus shown in FIG. 1.

Referring also to FIG. 4, a feeder tube 64 is provided as a means for dispersing product to be dried. Feeder tube 64 is located within a bore 66 in shaft 26 at shaft upper end 68 and exits shaft 26 at an angle below a dryer housing cover 70. As shown, feeder tube 64 is elbow shaped, exiting shaft 26 at approximately a forty-five degree angle. Drive assembly 44 includes a pulley 72 which is coupled to shaft 26 at upper end 68 for imparting rotational motion to shaft 26 and screw auger 24 by means of a belt (not shown) to an external motor (not shown) or the like. It will be appreciated that a motor could also be mounted directly on the apparatus if desired. Bushing 74, shaft collar 76, and bearing assembly 78 surround shaft 26, supported by bearing support 80 associated with housing cover 70. A seal 82 prevents gas leakage between shaft 26 and housing cover 70. Bearing assembly 78 is coupled to bearing support 80 by conventional fasteners 84 such as bolts and nuts, and cover 70 is shown attached to dryer housing 12 by similar conventional fasteners 86.

A flange 88 on shaft upper end 68 permits attachment to a pipe or hose so that products can be conveyed into the drying apparatus through product inlet 90. A flange 92 is also included on feeder tube 64 so that a suitable tube extension 94 can be attached whereby the product exiting the feeder tube 64 can be directed over the top of the bed of balls 22 with the end of tube extension 94 preferably positioned over the radial center of the bed of balls. Additionally, a deflector plate (not shown) can be positioned near the opening of tube extension 94 to deflect particulates where the product does not consist of slurries or liquids. Where liquid products are being dried, a liquid spreader 96 can be attached to the end of tube extension 94 so that the liquid 97 can be sprayed, spread, dripped, or otherwise directed onto the bed of balls 22 through nozzles 98. Since the feeder tube 64 and thus attached adapters rotate with shaft 26, the product to be dried is spread evenly on top of the bed of balls 22. Choice of shape and positioning of such adapters allows precise control over the spreading of products within the drying chamber 14. It will be appreciated, therefore, that particulates can be air conveyed into the apparatus and to the bed of balls, while liquids would be sprayed or dripped on the bed. If the product is a slurry or a mixture of both solid particulates and a liquid, the product can be extruded through a nozzle and impinged by air and distributed or sprayed over the top of the bed.

Figure 5:
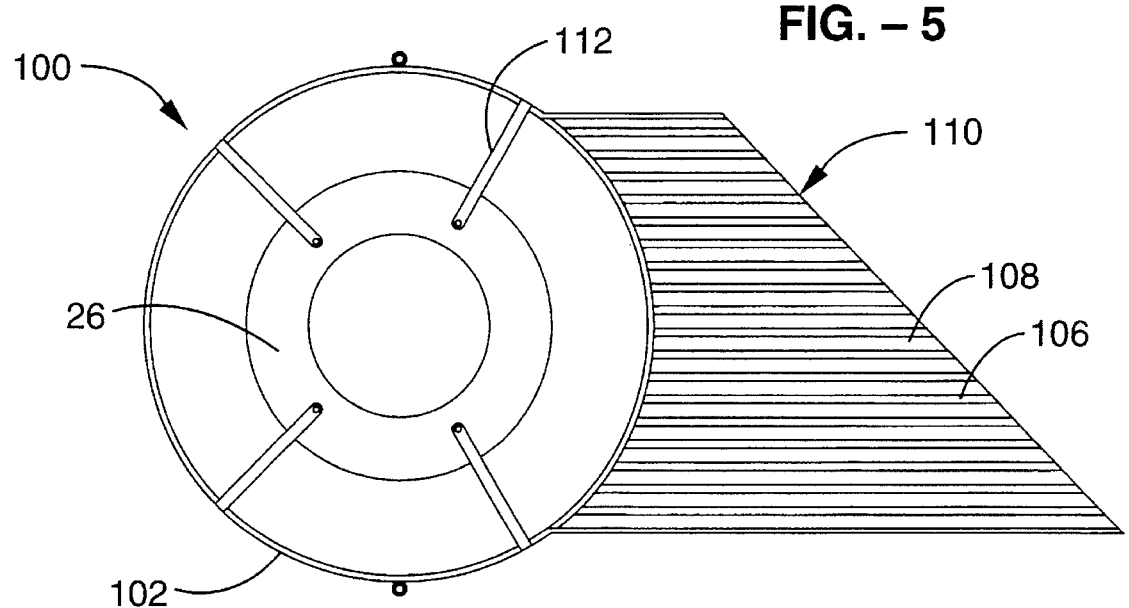
FIG. 5 is plan view of the ball distributor portion of the apparatus shown in FIG. 1.
Figure 6:
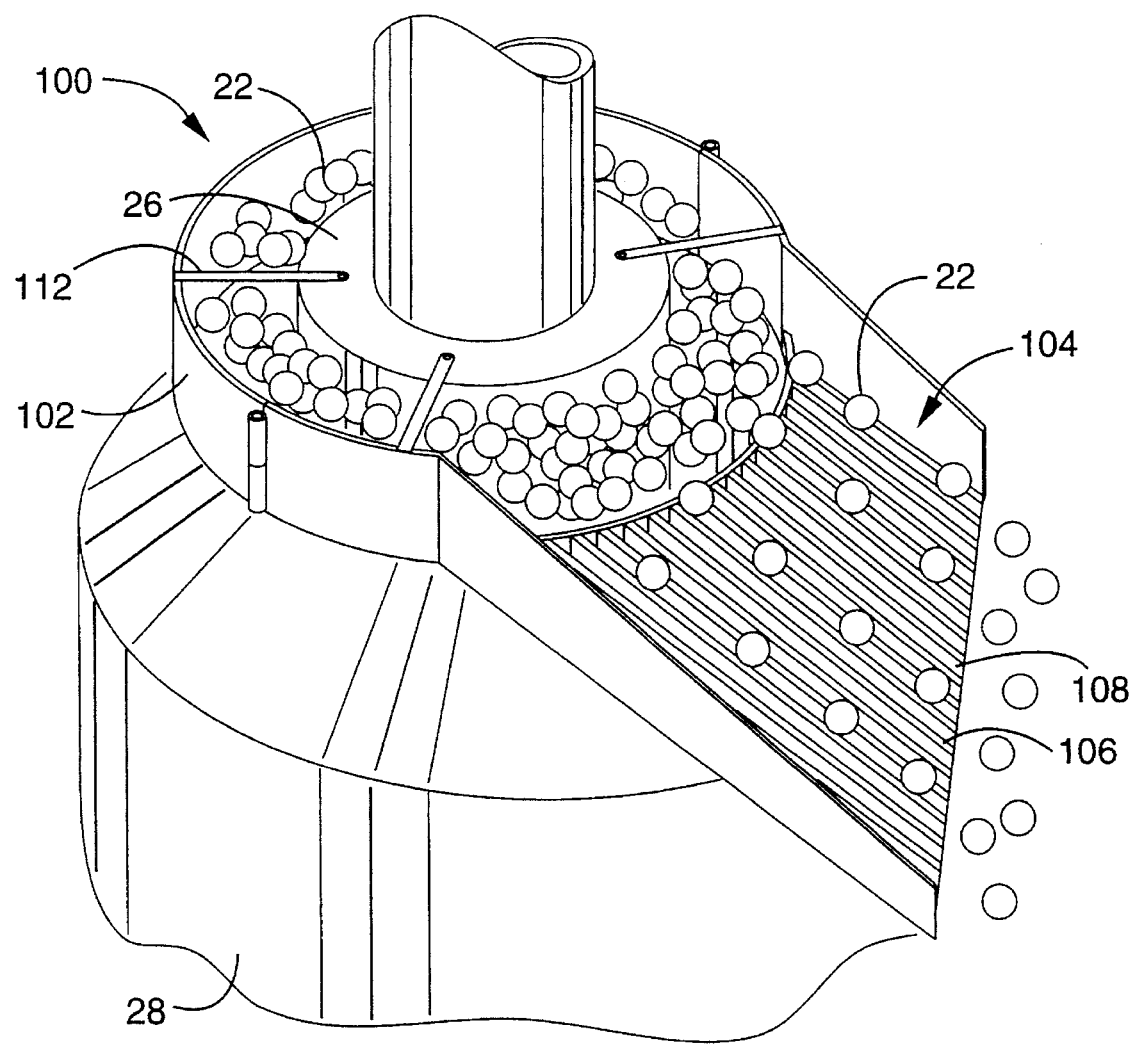
FIG. 6 is a perspective view of the ball distributor shown in FIG. 5.

Referring also to FIG. 5 and FIG. 6, a rotating ball distributer 100 is provided as a means for evenly distributing balls 22 as they are ejected from screw auger 24. Balls 22 are moved upward into ball distributer 100 by screw auger 24 where they are contained by an outer wall 102 and directed into a chute 104. Positioned on the bottom surface of chute 104 are a plurality of generally parallel ribs or bars 106 which are spaced so as to form guide channels 108 for receiving and guiding the balls. As can be seen, the bottom surface of chute 104 tapers downward toward the bed of balls so that the balls entering chute 104 will roll out of the chute and the balls are guided by the channels 108. In this way, balls 22 roll out of chute 104 in generally parallel rows for even distribution onto the bed. In addition, chute 104 is coupled to auger shaft 26 by means of a plurality of coupling braces 112. In this way, chute 104 will rotate with auger shaft 26 to distribute balls 22 circumferentially over the bed of balls. The bottom of chute 104 also includes a tapered distal end 110 so that balls 22 are distributed at different radial positions between central body 28 and dryer housing 12 as chute 104 rotates. This also provides for even distribution of the balls. As a result, the balls 22 are distributed evenly across the bed and the top of the bed is maintained as a generally uniform and flat surface.

When used, drying apparatus 10 and heater/blower 58 are preferably mounted in a frame 114 to support them in convenient positions. A source of rotational power is applied to shaft 26 by pulley 72 or through an integral motor to drive screw auger 24 which circulates balls 22 downward through drying chamber 14 and upward through center body 28. As balls 22 exit the top 34 of center body 28 and enter ball distributor 100, they are retained by wall 102 until they can drop down into chute 104 and roll along channels 108 to form an even bed of balls 22 within drying chamber 14. Product to be dried is fed from an external source into product inlet 90, through bore 66 in shaft 26 and through feeder tube 64, where either a tube extension 94 is employed or a tube extension 94 is employed in combination with a liquid spreader 96 to apply the product evenly across the top of the bed of balls 22. As the balls 22 circulate through the drying chamber 14, the product coats the surfaces of the balls, thereby maximizing the surface area exposed to drying. The balls coated with product move downward in drying chamber 14 toward the drying tubes 52. Heated gas which is injected through the drying tubes 52 is forced downward through orifices 54 and into the bed of balls where it permeates the bed of balls and moves upward through drying chamber 14 where it is vented through gas outlet 62. Ultimately, the balls migrate downward towards separation grid 46, where dried product falls into separator cone 16 and exits drying chamber 14 through particle outlet 18.

Note that drying apparatus 10 can be used for drying in a counter-current or co-current fashion. In the counter-current mode, drying gas is injected into the drying chamber 14 from drying tubes 52, either directly or through gas supply duct 48, and the gas eventually is vented through exhaust outlet 62. Thus, the direction of gas flow is counter to the direction of ball circulation. Counter-current drying results in drier product being generally lower in the bed of balls, while the wetter products are closer to the top of the bed, which aids in removal of the dry product from the balls. The wetter product at the top of the bed creates a self-scrubbing effect by capturing small particles of dry product that break loose and move with the gas stream, which would otherwise be carried out through exhaust outlet 62 and lost. As can be seen, therefore, a portion of the heated gas flows upward and through the drying chamber 14, while a smaller portion flows downward to act as a separator and conveying media for the dried product. The heated gas moving upward through the drying chamber 14 serves two purposes: first, it imparts heat to the product carrying balls and, second, it serves as a medium to remove the moisture content of the product being dried. The temperature of the heated gas is such that it slowly removes the moisture content to facilitate capturing gentle and subtle fragrances, essence, and chemical makeup of the product. However, the temperature can also be elevated to a point where a physiological change is made to the product being dried, such as for sterilization.

Note that by operating the apparatus in this counter-current configuration, extraction of materials is also possible. For example, hydrocarbons in oil contaminated soil will be volatilized thereby eliminating hazardous waste from the soil and making it sterile and ready for immediate reuse. The method can also be used to toast certain foods as they are dried. For example, by drying onions at an elevated temperature in excess of 300° F., the onions will dry and toast at the same time. Additionally, the method can be used to dry liquids, slurries, particulates or a mixture of all three. By making the apparatus and balls from high temperature resistant materials such as stainless steel or ceramics, the dryer can be operated at extremely high temperatures and operated as a moving bed reactor.

In co-current drying, the drying gas enters drying chamber 14 through exhaust outlet 62, which would serve as a gas inlet, and exits through the orifices 54 in drying tubes 52, which would serve as a gas outlet. Thus, the drying gas moves in the same direction as the balls 22. In this way, gas is introduced at the top of the dryer and the highest temperature heat is in contact with the most dilute form of the product being dried. Co-current drying is effective when drying dilute products dissolved or dispersed in liquids and is the most effective way to remove the liquid since the warmest drying gas is immediately exposed to the wettest product at the top of the drying bed. This method also lends itself to drying product that needs a second or a three-temperature mix of gas to assure complete drying and product temperature, control; that is, the product can be cooled after being dried so that it can achieve a particular crystalline form or render itself more readily released from the balls carrying it through the bed.

Figure 7:
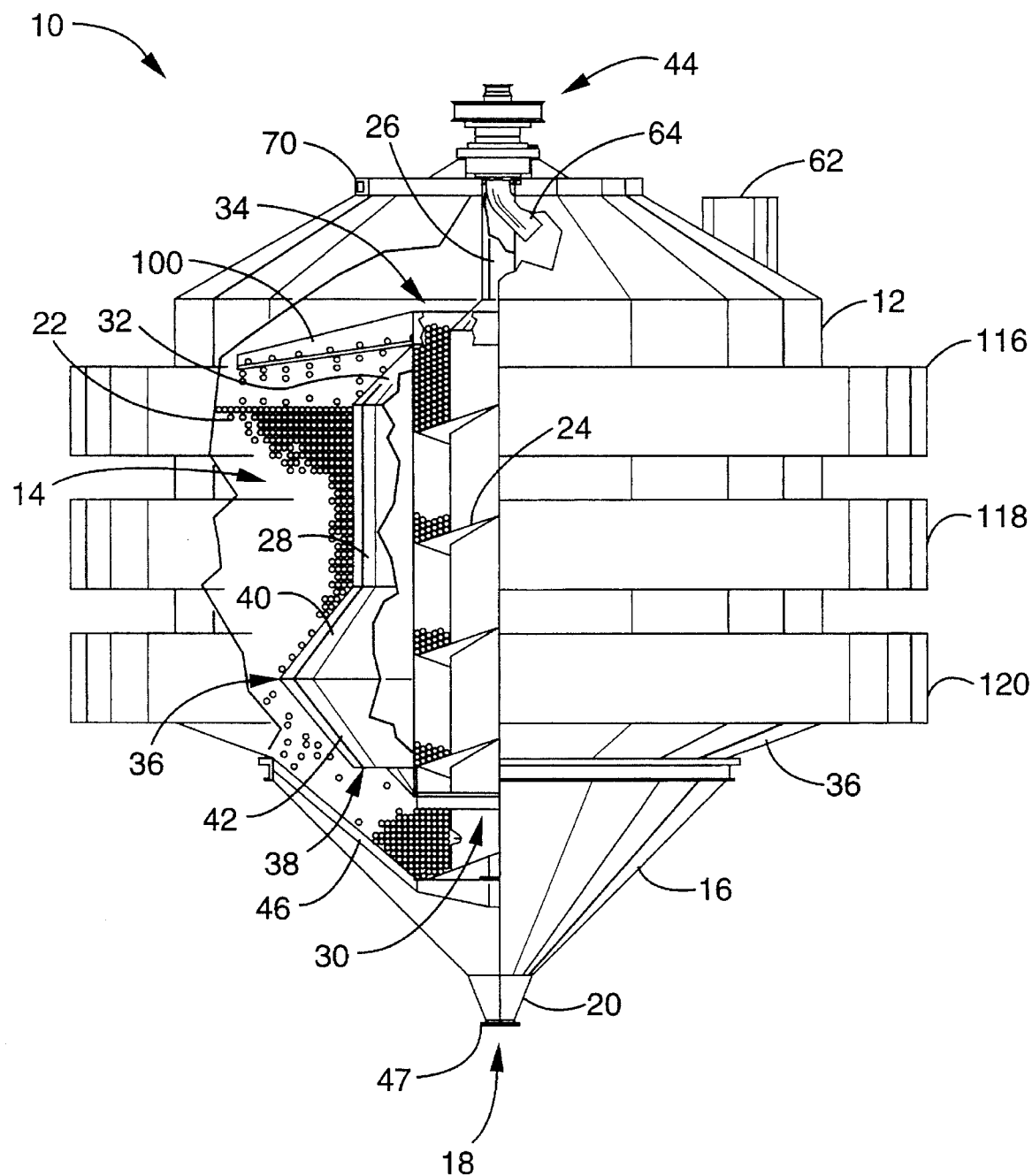
FIG. 7 is a side elevation of an alternative embodiment of the present invention in partial cutaway showing multiple temperature gas ducting.

Referring also to FIG. 7, it can be seen that the apparatus is not limited to a single gas supply and that a plurality of gas supplies can be employed. In this configuration, the apparatus is configured with three drying zones established by a high temperature duct 116, a medium temperature duct 118, and a low temperature duct 120. For example, when drying products such as slurries with a low solid content such as ten percent, the product can withstand more heat. The product would be dried using the counter-current method and, for example, the gas temperatures for the high, medium, and low temperature ducts could be on the order of 275° F., 150° F., and 100° F., respectively.

As can be seen, therefore, by using counter-current or co-current drying, drying apparatus 10 can be used for drying a large variety of products, including chemical, pharmaceutical, and food products. Nearly any product composition, including granular solids, sludges, slurries, dispersions, and solutions, can be dried. Drying apparatus 10 can be used to dry sewage sludge into a dry product suitable for use as fertilizer. By use of suitable high temperature materials, such as steel balls 22 for the drying bed, soil contaminated with volatile hydrocarbon and chlorocarbon compounds can be decontaminated in drying apparatus 10, yielding decontaminated, sterilized soil. The overall effect of the ball circulation within the dryer and the drying gas is an application zone at the top of the bed where products are added, a drying zone within the bed where the heated gas interacts with the products in the drying bed, and a separation zone at the bottom of the bed where dried products are dislodged from the balls and fall through the grate. If desired, the drying gas stream can be divided, with part of the inlet gas directed to the drying zone of the bed, and part directed to the separation zone to aid in removing dried products from the balls.

Generally, air is used as the drying gas. However, use of inert gas for drying of air sensitive products is contemplated with drying apparatus 10. The apparatus could be sealed for recirculation and a condenser or other dehumidifying means included within the closed system. In this way, inert gas ladened with water or solvent could be passed through the humidifier and the heat generated from the humidifier could be added back to the system, with the inert gas being used for drying. Such a configuration would eliminate oxidation which can alter the color, texture or taste of certain food products.

The present invention can also be used as art exhaust gas scrubber. Combustion processes frequently create exhaust containing gases regulated under the Clean Air Act such as sulfur dioxide $SO_2$ and nitrogen oxides $NO_x$. Exhaust fumes/ gas can be directed into drying chamber in the same manner as drying gas. A solution of scrubbing material such as aqueous ammonia or calcium carbonate $CaCO_3$ would be applied continuously to coat the bed of balls. $SO_2$ and/or $NO_x$ would react with the aqueous ammonia and calcium carbonate to form calcium nitrate $CaNO_2$, ammonium nitrate $NH_4NO_3$ (which can be used fertilizer), calcium sulfate $CaSO_4$ (gypsum), and ammonium sulfate $NH_4SO_4$, depending upon the exhaust gasses present and the scrubbing solution used. Additionally, the dryer can be used to efficiently dry normally sticky materials such as papaya which are difficult to dry. An example of a process for doing so is to coat a first batch of papaya with rice flow or the like and then introduce the coated papaya into the dryer. The dried papaya would then be ground into a power and applied as a coating for the next and subsequent batches to be dried. Drying sticky products in this manner completely eliminates sticking to the balls 22.

Accordingly, it will be seen that this invention provides an apparatus and method process) for drying products which allows for even application of product to the drying bed, even application of balls in the drying bed, and which is suitable for use with inert atmosphere. Although the description above contains many specificities, these should not be construed as limiting the scope of the invention but as merely providing illustrations of some of the presently preferred embodiments of this invention. Thus, the scope of this invention should be determined by the appended claims and their legal equivalents.

What is claimed is:

1. An apparatus for drying products comprising:
   (a) a dryer housing, said housing containing a drying chamber;
   (b) a plurality of balls, said balls forming a bed within said drying chamber;
   (c) ball circulating means for circulating said balls through said drying chamber;
   (d) said ball circulating means including a chute, said chute having a tapered end extending over said bed of balls;
   (e) product dispersing means for evenly dispersing product to be dried onto said bed of balls;
   (f) drying means for drying said product on said balls; and
   (g) product separating means for separating said dried product from said balls.

2. An apparatus as recited in claim 1, wherein said ball circulating means comprises a screw auger, said screw auger having a shaft, said screw auger positioned within a central body, said central body positioned coaxially within said dryer housing, said central body including an annular skirt, said drying chamber positioned between said central body and said dryer housing, said central body and said screw auger having upper and lower ends.

3. An apparatus as recited in claim 1, wherein said chute includes a plurality of channel means for receiving and guiding said balls.

4. An apparatus as recited in claim 1, wherein said product dispersing means comprises a tube coupled to said ball circulating means, said tube having an open end extending over said bed of balls.

5. An apparatus as recited in claim 1, wherein said drying means comprises a plurality of drying tubes positioned within said drying chamber.

6. An apparatus as recited in claim 5, further comprising a gas duct, said gas duct positioned circumferentially around said dryer housing, said gas duct coupled to said drying tubes.

7. An apparatus as recited in claim 6, further comprising heater means coupled to said gas duct for heating a source of drying gas and blowing said heated gas into said gas duct.

8. An apparatus as recited in claim 1, wherein said product separating means comprises a grid within said drying chamber, said grid including a plurality of openings, said openings structured and configured to permit dried product to pass therethrough while retaining said balls.

9. A drying apparatus, comprising:
(a) a dryer housing, said dryer housing having upper and lower ends;
(b) a central body, said central body having upper and lower ends, said central body positioned coaxially within said dryer housing, said central body including a tapered skirt proximate to said lower end;
(c) a drying chamber, said drying chamber positioned between said dryer housing and said central body;
(d) a plurality of balls, said balls forming a bed within said drying chamber;
(e) a vertically mounted screw auger, said screw auger positioned coaxially within said central body, said screw auger having a shaft, said shaft having upper and lower ends;
(f) an arcuate feeder tube, said feeder tube extending outward from said shaft, said feeder tube including an end extending over said bed of balls;
(g) a chute, said chute coupled to said shaft proximate to said upper end of said central body, said chute having a tapered end extending over said bed of balls, said tapered end being rotationally positioned opposite said end of said feeder tube;
(h) a plurality of drying tubes positioned within said drying chamber and coupled to a source of drying gas; and
(i) a separation grid within said drying chamber, said separation grid including a plurality of openings, said openings structured and configured to permit dried product to pass therethrough while retaining said balls.

10. A drying apparatus as recited in claim 9, wherein said chute includes a plurality of channel means for receiving and guiding said balls.

11. An apparatus as recited in claim 9, wherein said drying tubes are positioned radially within said drying chamber, said drying tubes extending between said dryer housing and said central body, each said drying tube including a gas inlet and a plurality of gas outlets.

12. An apparatus as recited in claim 11, further comprising a gas duct, said gas duct positioned circumferentially around said dryer housing, said gas duct coupled to said drying tube gas inlets.

13. An apparatus as recited in claim 12, further comprising heater means coupled to said gas duct for heating a source of drying gas and blowing said heated gas into said gas duct.

14. An apparatus as recited in claim 9, wherein said drying chamber includes upper and lower ends, said drying chamber having a cone shape with a vertex proximate to said lower end.

15. An apparatus as recited in claim 14, wherein said separation grid is positioned proximate to said lower end of said drying chamber, said lower end of said screw auger and said lower end of said central body.

16. An apparatus for removing moisture form solid or liquified materials,
(a) a dryer housing, said dryer housing having upper and lower ends;
(b) a central body, said central body having upper and lower ends, said central body positioned coaxially within said dryer housing, said central body including a tapered skirt proximate to said lower end;
(c) a drying chamber, said drying chamber positioned between said dryer housing and said central body;
(d) a plurality of balls, said balls forming a bed within said drying chamber;
(e) a vertically mounted screw auger, said screw auger positioned coaxially within said central body, said screw auger having a shaft, said shaft having upper and lower ends;
(f) a rotating arcuate feeder tube, said feeder tube extending outward from said shaft, said feeder tube including an end extending over said bed of balls;
(g) a rotating chute, said chute coupled to said shaft proximate to said upper end of said central body, said chute having a tapered end extending over said bed of balls, said tapered end being rotationally positioned opposite said end of said feeder tube, said chute including a plurality of ball guide channels;
(h) a plurality of drying tubes positioned within said drying chamber, said drying tubes being positioned radially within said drying chamber, said drying tubes extending between said dryer housing and said central body, each drying tube including a gas inlet and a plurality of gas outlets;
(i) a gas duct, said gas duct positioned circumferentially around said dryer housing, said gas duct coupled to said drying tube gas inlets;
(j) heating means coupled to said gas duct for heating a source of drying gas and blowing said heated drying gas into said gas duct; and
(k) a grid within said drying chamber, said grid including a plurality of openings, said openings structured and configured to permit dried product to pass therethrough while retaining said balls.

17. An apparatus as recited in claim 16, wherein said drying chamber has upper and lower ends, said a top and a bottom, said drying chamber having a cone shape with a vertex at said bottom of said drying chamber.

18. An apparatus as recited in claim 17, wherein said grid is included in said vertex of said drying chamber, said grid being proximate to said lower end of said screw auger and said central body.

* * * * *